July 28, 1942.  R. L. WOLFF  2,291,516
SELECTOR SWITCH
Filed Sept. 1, 1939  3 Sheets-Sheet 1

INVENTOR
R. L. WOLFF
BY John W. Michael
ATTORNEY

July 28, 1942.  R. L. WOLFF  2,291,516
SELECTOR SWITCH
Filed Sept. 1, 1939   3 Sheets-Sheet 2

INVENTOR
R. L. WOLFF
BY John W. Michael
ATTORNEY

INVENTOR
R. L. WOLFF
BY John W. Michael
ATTORNEY

Patented July 28, 1942

2,291,516

UNITED STATES PATENT OFFICE 2,291,516

SELECTOR SWITCH

Robert L. Wolff, Milwaukee, Wis., assignor to Globe-Union, Inc., Milwaukee, Wis., a corporation of Delaware Application September 1, 1939, Serial No. 293,015

13 Claims. (Cl. 200—6)

This invention relates to an improvement in selector switches for use in radio broadcasting and receiving, public address and call systems, in test instruments, and for varied and diverse industrial uses.

The switch may be employed in the control panels for commercial and amateur transmitters, in the band-changing, selectivity, sensitivity or tone control of radio receivers, in centralized sound intercommunicator or call systems, in signal generators, analyzers, tube testers, and multimeter instruments, and in electronic apparatus, signaling devices, business machines, and the like.

One of the principal objects of the present invention is to provide a simple, compact, and closely organized switch structure of this character, which may be mounted singly or in groups on a control panel, and which is reliable and effective in operation, lending itself to easy and convenient manipulation.

The switch is so organized that it is adapted to a wide range of indexing. For example, in a two-position switch embodying the present invention the switch may be positively indexed in either of its two positions, or it may be spring-returned to center from either side. Similarly, in a three-position switch embodying the present invention, the index action can be positive in all positions, or spring return to center from either side, or it may be positive on one side of center and spring return to center on the other side.

Another object of the invention is to provide a switch which has the capability of effectively employing a sufficient number of contacts to render available a great many shorting or non-shorting sequences.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1:
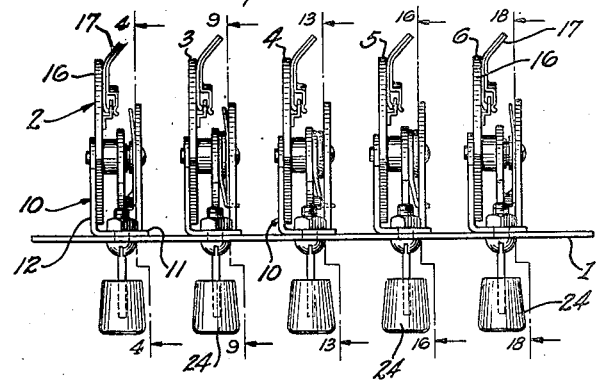
Figure 1 is a view in top plan showing a group of switches embodying the present invention and supported on a common control panel.
Figure 2:
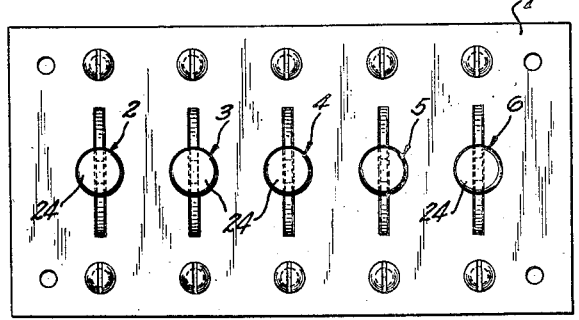
Figure 2 is a view in front elevation of the structure shown in Figure 1.

Referring to the drawings, and more particularly to Figures 1 and 2, the numeral 1 designates a control panel, which may be mounted on any suitable support. The switches, embodying the present invention, and here shown as being five in number, are designated generally as 2, 3, 4, 5, and 6. These switches are in many important features identical in construction, and differ only in the provisions made for variation in the type and number of indexing movement, and also in the number of cooperable contacts incorporated in each switch.

Figure 3:
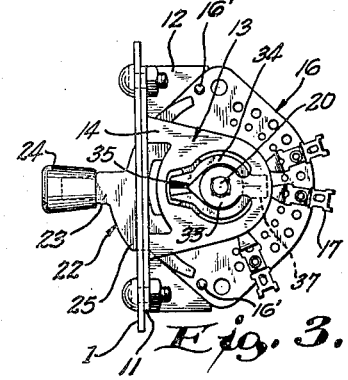
Figure 3 is a view in end elevation looking toward the right-hand side of Figure 1.

Each of the switches includes a mounting bracket, designated generally at 10. Each bracket 10 has a front plate 11 and an integral side plate 12 extending rearwardly from the front plate 11 and disposed at right angles thereto. The mounting bracket is completed by a hanger bracket plate 13, shaped as shown in Figure 3 and having attaching lugs 14 integral therewith and riveted or otherwise suitably fixed to the front plate of the bracket in spaced parallel relation to the other side plate 12 thereof. The front plate of each mounting bracket is provided with an elongated, vertical slot 15, which, when the switch is mounted on its panel, registers with a similar slot provided therefor in the panel.

Each switch includes a stator 16 constituted of a U-shaped piece of insulating material, such as "Bakelite," the legs of the stator overlapping the side plate 12 and being secured thereto by eyelets 16', or the like. In the present instance the apertured enlargements on opposed portions of the legs of the stator do not perform any useful purpose. They actually appear on devices manufactured for the reason that the switch is made up from material also employed for manufacturing an all-wave band switch for which an application for patent was filed September 20, 1939, Serial No. 295,707, by John S. Caldwell, for "Switches," said application and the present case both being owned by the same assignee. The stator 16 carries fixed contacts 17 of the switch which will vary in number depending upon the nature of the circuit to be controlled. A rotor 18 also made of insulating material is rotatably mounted within the confines of the stator and carries the movable contacts 19 of the switch. The contacts 17 are double-wipe contacts and straddle the movable contacts 19 of the rotor.

Figure 6:
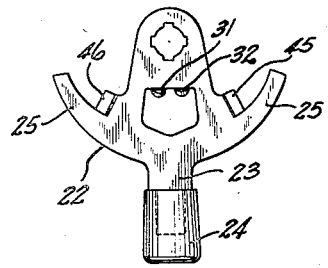
Figure 6 is a detail view in elevation of the operating lever of each switch unit.
Figure 21:
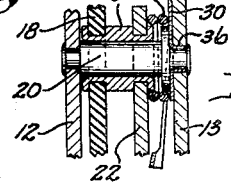
Figure 21 is a fragmentary view in section taken on line 21—21 of Figure 5, and showing how the fixed supporting shaft is secured to the mounting bracket, and the way in which the rotatable bearing sleeve for the switch rotor and its operating lever is mounted thereon.
Figure 8:
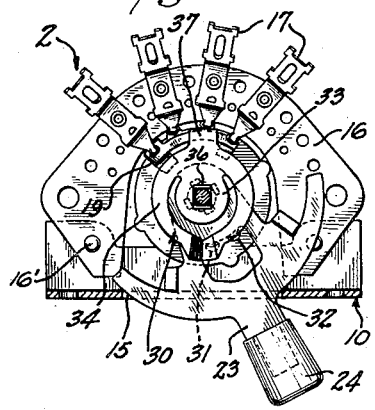
Figure 9:
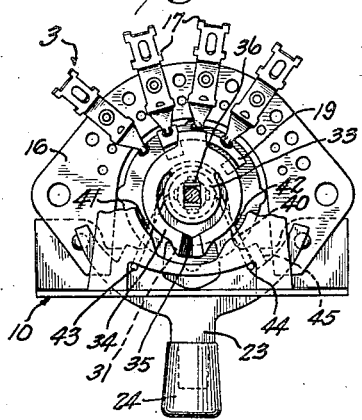
Figure 9 is a view in transverse vertical cross section taken on the line 9—9 of Figure 1, and looking in the direction of the arrows.
Figure 10:
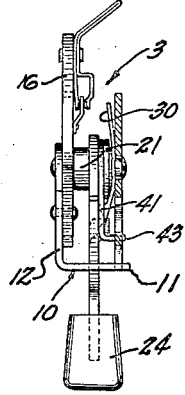
Figure 10 is a plan view of the switch shown in Figure 9, with a portion of the mounting bracket broken away and shown in section for the sake of illustration.
Figure 20:
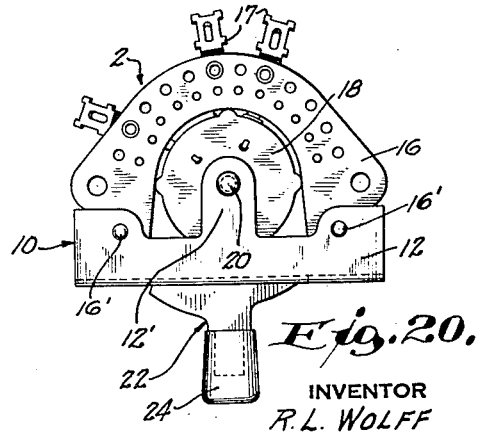
Figure 20 is a view in end elevation looking toward the left-hand end of Figure 1.

In each switch embodying the present invention a supporting shaft 20 is provided, and has reduced ends extending through openings provided therefor in an extension 12' of the side plate 12, and in the central portion of the plate 13. (See Figures 5, 20 and 21.) The ends of the shaft 20 are riveted or upset over into secure engagement with the margins in the openings in its supporting parts. A bearing sleeve 21 is rotatably mounted on each shaft 20. Both ends of this bearing sleeve are notched or slotted to adapt the ends to be staked or fastened to the rotor 18 and to a switch operating lever, designated generally at 22. The lever 22, which is shaped as shown in Figure 6, has a tang 23, which projects through the vertical slot in the mounting bracket 10, and through the registering slot in the control panel 1. A knob 24 is secured to the portion of each tang 23 which is disposed exteriorly of the panel 1. In order that these slots 15 may be closed in all positions of the switch lever, the lever 22 is formed with arcuate wings or extensions 25 which rotate in the slots when the lever is swung, and which afford a closure for the slots in all positions of the switch.

It will be understood from the foregoing that the rotor 18 and switch lever 22, being fixed to the opposite ends of the same sleeve, are rotatively coupled together so that when any lever 22 is turned the rotor 18 of its switch will also be turned.

Depending upon the requirements of the particular application, the switch lever may be spring-returned to center from either or both sides, or may be positively indexed in one or more positions. And the switch may be constituted to serve as a two-position or a three-position switch.

In the construction illustrated in the drawings, the switch 2 is a three-position, positively indexed switch. For this purpose a spring-biased detent, designated generally at 30, is fixed to the inner face of the bracket plate 13, and is co-operatively interrelated with a pair of index lugs 31 and 32, which may be formed as integral parts of the switch-operating lever 22. (See Figures 4, 5, 6, 7, and 8.)

The detent 30 comprises a generally circular piece of spring steel, or other suitably resilient metal, which is slotted circumferentially and inwardly of its periphery to provide a hub portion 33 and an arcuate strip-like portion 34. The portion 34 is displaced from the plane of the hub portion and is set in such displaced position. A wedge-like projection or detent proper, designated at 35, is formed in the portion 34. In the assembly the hub portion 33 of the plate is fitted on the shaft 20 and flush up against the inner face of the bracket plate 13, and anchoring lugs 36 integral with the hub portion 33 are forced into the slight clearance between the adjacent reduced end of shaft 20 and its bearing opening in bracket plate 13 to secure the detent 30 in place. In addition the detent 30 has an integral attaching tab 37 which is spot-welded to the bracket plate 13. In this way the detent is firmly secured in place, but the strip-like portion 34 is spaced from the bracket plate 13 and is free to be sprung toward and away from the plane of movement of the operating lever 22 as it must when its wedge-like projection 35 rides over the lugs 31 and 32 of the operating lever 22.

Figures 4, 5:
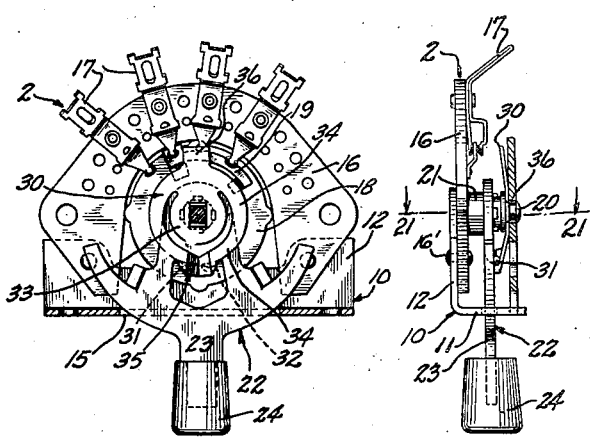
Figure 4 is a view in transverse vertical cross section taken on line 4—4 of Figure 1, and looking in the direction of the arrows.
Figure 5 is a view in top plan of the switch shown in Figure 4, with a portion of the mounting bracket shown in section for the sake of illustration.
Figure 7:
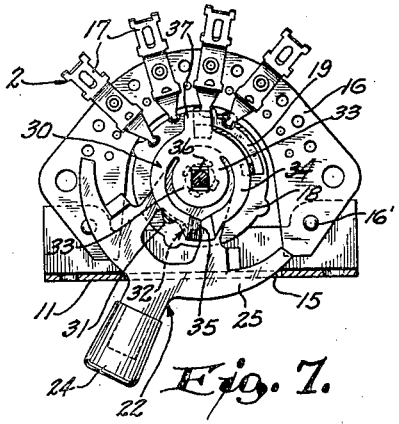
Figures 7 and 8 are views similar to Figure 4 but showing different positions of the switch parts.

In the central or normal position of the switch, which is illustrated in Figure 4, the wedge-like projection 35 of the detent lies in between the lugs 31 and 32, and its sloping sides are engaged with these lugs. In this way the switch is releasably held in its mid-position. If the switch is swung to the left from the position shown in Figure 4, it moves to the position shown in Figure 7, and in partaking of such movement the lug 32 rides across both sloping surfaces of the detent projection 35, and the lug 32 comes to rest engaged with one of these sloping surfaces, thereby positively retaining the switch in the position shown in Figure 7. A reverse movement of the switch lever brings it to the position shown in Figure 8 where the lug 31 is engaged with the opposite sloping surface of the wedge-shaped detent.

Figure 11:
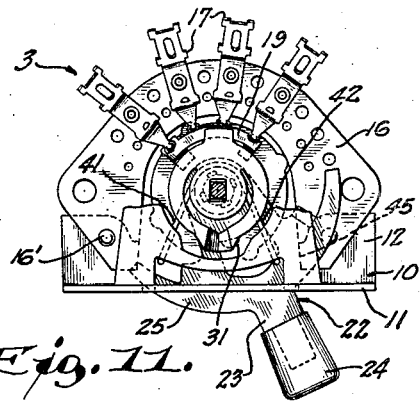
Figures 11 and 12 are views similar to Figure 9 but showing different positions of the switch parts.
Figure 12:
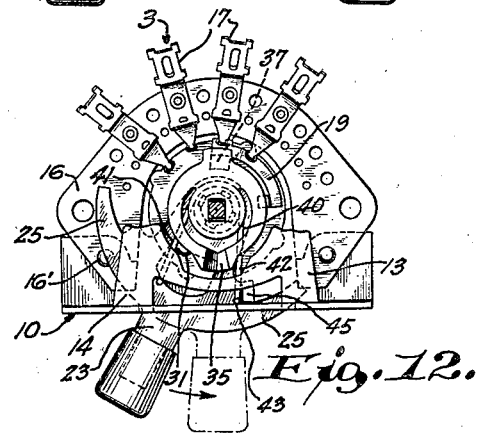

The switch 3 is also a three-position switch, but is so constituted that the switch lever is positively indexed in two of its positions, and is spring-returned to a central or normal position from one side of its center position. This particular form of switch is described and claimed in the application of Robert L. Wolff, Serial No. 379,228, filed February 17, 1941, as a division of this application. In carrying out this purpose, the switch 3 is provided with the detent 35, as in the other type of switch, but the lug 32 is omitted so that the switch is positively indexed only when it it swung to the position shown in Figure 11. In order to effect a spring return of the switch lever from the full to the dotted line position illustrated in Figure 12, a return spring, designated generally at 40, is provided. The spring 40 has several coils which surround an end portion of the shaft 20 and also has diverging spring arms 41 and 42 provided with outturned ends 43 and 44, which are engaged in and tensioned by the crotches provided between the main portion of the plate 13 and its attaching lugs 14. This arrangement disposes the spring arms in a plane parallel and adjacent to the switch lever. Then by providing a spring-engaging finger 45 on the switch lever, when the lever is swung from dotted to full line position in Figure 12, its finger 45 will engage its spring arm 42 and further tension it so that as soon as the operator releases his grip on the knob of the switch the spring will return it to the position where its lug 31 engages the adjacent side of the detent 35.

Figure 13:
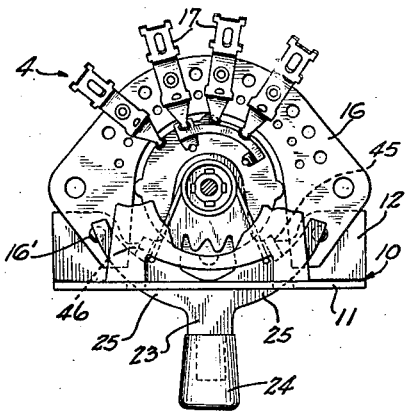
Figure 13 is a view taken on line 13—13 of Figure 1 and looking in the direction of the arrows.
Figure 14:
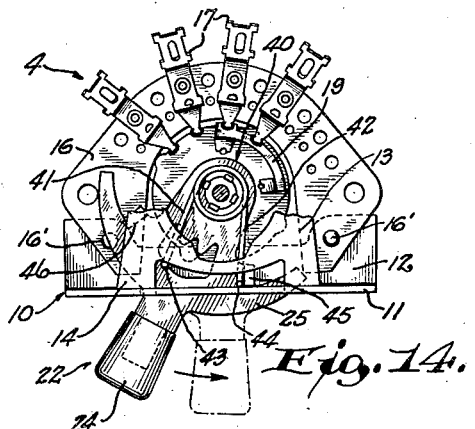
Figures 14 and 15 are views similar to Figure 13 but showing different positions of the switch parts.
Figure 15:
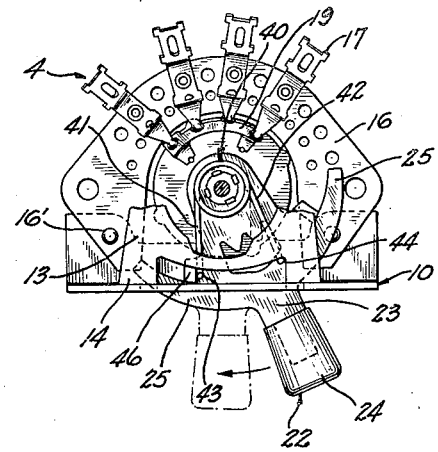

The switch 4 is a three-position spring return switch. To provide a switch with this type of action, the detent 30 and detent-engaging lugs 31 and 32 are omitted, or are bent back into the plane of the lever 22 so as to be ineffective, but the spring 40 is provided, and the lever 22 is equipped not only with the spring-engaging finger 45 for the spring arm 42, but also has a second spring-engaging finger 46 cooperable with the spring arm 41. By having two spring-engaging fingers 45 and 46, when the switch lever is swung in either direction away from a central position one of the fingers will engage one of the spring arms and move against its spring action, as will be understood from a comparison of Figures 13, 14, and 15. Release of the grip on the control knob will result in the spring arm immediately returning the switch to central position. In the central position the action of the spring arms 41 and 42 are restrained by their engagement with the bracket, but they are effective to releasably maintain the switch lever 22 in its mid-position.

Figure 16:
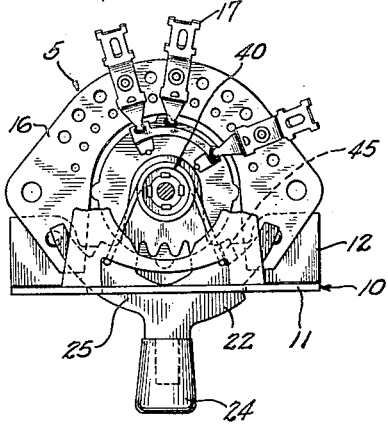
Figure 16 is a view in transverse vertical cross section taken on line 16—16 of Figure 1, and showing one position of the switch parts.
Figure 17:
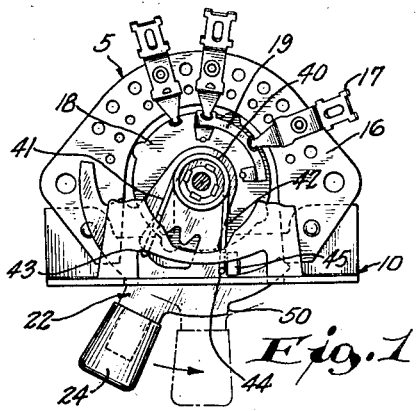
Figure 17 is a view similar to Figure 16 but showing the other position of the switch parts.

The switch 5 is a two-position spring return type of switch. Here again the detent 30 and the detent-engaging lugs 31 and 32 are omitted. The spring 40 is employed, but only one spring-engaging finger, namely finger 45, is provided on the lever 22, the other being bent into the plane of the lever, or being cut off. In order to stop the lever in the mid-position, one of its wings is formed with a stop shoulder 50, which is engageable with the control panel to provide the desired stopping action. Figures 16 and 17 illustrate the action of the switch 5.

Figure 18:
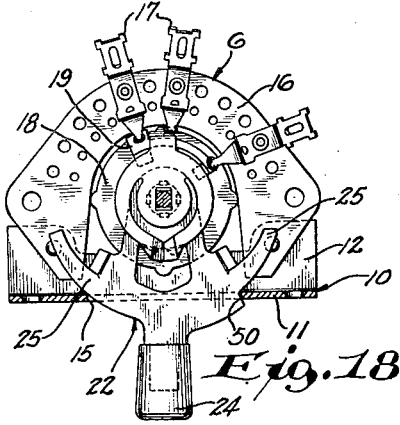
Figure 18 is a view in transverse cross section taken on line 18—18 of Figure 1, and looking in the direction of the arrows and showing one position of the switch parts.
Figure 19:
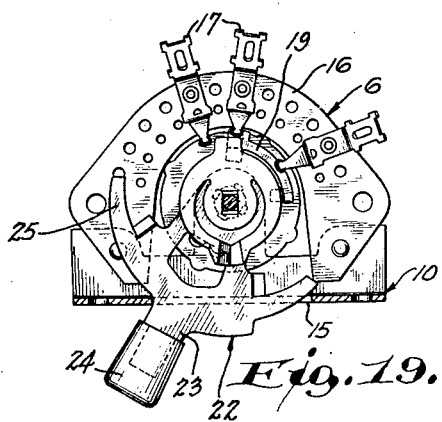
Figure 19 is a view similar to Figure 18 but showing the other position of the switch parts.

The switch 6 is a two-position, positively indexed type of switch. In this type the spring 40 and spring-engaging fingers 45 and 46 are omitted. The detent 30 and its cooperable lugs 31 and 32 are employed as before. However, due to the provision of stop shoulder 50 on the lever 22 of the switch 6, the switch lever may occupy only a center position, as shown in Figure 18, and a position to the left of center, as viewed in Figure 19.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. A selector switch of the character described comprising a mounting bracket including a slotted front plate and spaced side plates disposed at right angles to the front plate, a stator generally U-shaped having its legs engaged with and fixed to one of said side plates, a rotor cooperably interrelated with the stator, switch contacts carried by the rotor and stator, a supporting shaft fixed to the side plates of said mounting bracket, a bearing sleeve rotatably fitted on said shaft and having one end fixedly connected to the rotor, an operating lever fixed to the other end of said sleeve and having a portion projecting through the slot of the front plate and operable from the exterior of the bracket, spring means cooperable with the lever to bias it to one position, and indexing means carried by the bracket and cooperable with the lever to releasably retain it in at least one position.

2. A selector switch of the character described comprising a mounting bracket having a slotted front plate and spaced side plates, a U-shaped stator of insulating material having its legs engaged with and fixed to one of the side plates of the bracket, a disc-like rotor of insulating material disposed within the confines of the stator and rotatable with respect thereto, cooperable contacts carried by the rotor and the stator, a supporting shaft fixedly supported on the side plates of the bracket, a bearing sleeve mounted on the shaft and having one end fixedly interconnected with the rotor, an operating lever fixed to the other end of said sleeve and having a portion rotatable in the slot of the front plate, said portion of the lever being of arcuate form so as to provide a closure in all positions of the lever, a spring supported on the bracket and cooperable with the lever to bias it in one position, and indexing means mounted on the bracket and cooperable with the lever to releasably maintain it in at least two positions.

3. A selector switch of the character described comprising a mounting bracket having a slotted front plate and spaced side plates, a U-shaped stator of insulating material having its legs engaged with and fixed to one of the side plates of the bracket, a disc-like rotor of insulating material disposed within the confines of the stator and rotatable with respect thereto, cooperable contacts carried by the rotor and the stator, a supporting shaft fixedly supported on the side plates of the bracket, a bearing sleeve mounted on the shaft and having one end fixedly interconnected with the rotor, an operating lever fixed to the other end of said sleeve and having a portion rotatable in the slot of the front plate, said portion of the lever being of arcuate form so as to provide a closure in all positions of the lever, and indexing means cooperable with the lever and comprising a spring plate provided with an arcuate slot substantially paralleling the periphery of the plate and also formed with a lateral projection of wedge-like shape disposed adjacent one side of the lever, said lever having detent lugs straddling said wedge-like projection and cooperable therewith to releasably maintain said lever in any one of three positions to which it is manually shifted.

4. A selector switch of the character described comprising a mounting bracket including a slotted front plate and spaced side plates extending rearwardly from the front plate, a stator of insulating material of approximately U shape and fixed to one of said side plates, a rotor of insulating material cooperatively interrelated with the stator, switch contacts carried by the rotor and stator, a supporting shaft fixed to the side plates of said mounting bracket, a bearing sleeve rotatably fitted on said shaft and having one end fixedly connected to the rotor, an operating lever fixed to the other end of said sleeve and having a portion projecting through the slotted front plate and operable from the exterior of the bracket, and means for releasably maintaining said lever and said rotor in at least one position while providing for the shifting of the rotor to another position under the control of said lever.

5. A selector switch of the character described comprising a mounting bracket including a slotted front plate and spaced side plates extending rearwardly from said slotted front plate, a stator of insulating material fixed to one of said side plates, a rotor of insulating material cooperatively interrelated with the stator, switch contacts carried by the rotor and stator, an operating lever having a portion projecting through the slotted front plate and operable from the exterior of the bracket, means rotatively coupling said lever and said rotor and rotatably supporting said lever and said rotor on said side plates, and means interposed between and carried by the operating lever and the adjacent side plate of the bracket for releasably securing the operating lever in at least one position.

6. A selector switch of the character described comprising a mounting bracket including a slotted front plate and spaced side plates extending rearwardly from said slotted front plate, a stator of insulating material fixed to one of said side plates, a rotor of insulating material cooperatively interrelated with the stator, switch contacts carried by the rotor and stator, an operating lever having a portion projecting through the slotted front plate and operable from the exterior of the bracket, means rotatively coupling said lever and said rotor and rotatably supporting said lever and said rotor on said side plates, a spring plate secured to the side plate of the mounting bracket adjacent the lever and having a wedge-like projection biased toward the adjacent side of the lever, said lever having a detent lug cooperable with said projection to releasably maintain the lever in a position to which it is manually adjusted.

7. A selector switch of the character described comprising a mounting bracket including a slotted front plate and spaced side plates extending rearwardly from said slotted front plate, a stator of insulating material fixed to one of said side plates, a rotor of insulating material cooperatively interrelated with the stator, switch contacts carried by the rotor and stator, an operating lever having a portion projecting through the slotted front plate and operable from the exterior of the bracket, means rotatively coupling said lever and said rotor and rotatably supporting said lever and said rotor on said side plates, a spring plate secured to the side plate of the mounting bracket adjacent the lever and having a wedge-like projection biased toward the adjacent side of the lever, said lever having a detent lug cooperable with said projection to releasably maintain the lever in a position to which it is manually adjusted, said lever having a stop shoulder engageable with the front plate of the mounting bracket adjacent the end of its slot when the lever is in its original position.

8. A selector switch of the character described comprising a mounting bracket including a slotted front plate and spaced side plates extending rearwardly from the front plate, a stator of insulating material fixed to one of said side plates, a rotor of insulating material cooperatively interrelated with the stator, switch contacts carried by the rotor and stator, an operating lever having a portion projecting through the slotted front plate and operable from the exterior of the bracket, means for rotatively coupling the inner end of the lever and the rotor and for rotatively supporting both the lever and the rotor on said side plates, and positive indexing mechanism carried by the lever and the adjacent side plate of the bracket and effective to releasably though positively retain the lever in its various adjustments.

9. A selector switch of the character described comprising a mounting bracket including a slotted front plate and spaced side plates, a stator of insulating material fixed to one of said side plates, a rotor of insulating material cooperatively interrelated with the stator, switch contacts carried by the rotor and stator, an operating lever having a portion projecting through the slotted front plate and operable from the exterior of the bracket, means rotatively coupling said lever and said rotor, and rotatably supporting said lever and said rotor on said side plates, said lever having integrally formed therewith a pair of bendable detent lugs and a pair of bendable spring-engaging fingers, said lugs and said fingers being adapted to be selectively utilized to cooperate with a detent spring and a return spring respectively.

10. A selector switch of the character described comprising a mounting bracket, a supporting shaft rigidly fixed thereto, a bearing sleeve rotatably mounted on said shaft, a rotor of insulating material fixed to said sleeve, a stator of insulating material fixed to the bracket and extending around the periphery of said rotor, cooperable switch contacts carried by said rotor and said stator, and an operating lever also fixed to said sleeve and projecting beyond said bracket and manually operable from the exterior thereof.

11. A selector switch of the character described comprising a mounting bracket including a slotted front plate and a rearwardly extending side plate, a stator fixed to said side plate, a rotor associated with said stator, switch contacts carried by said rotor and stator, an operating lever having a portion projecting through said slotted front plate, said lever being operatively connected to said rotor, and means carried by said side plate for rotatably supporting said rotor and said lever.

12. A selector switch of the character described comprising a mounting bracket including a slotted front plate and a rearwardly extending side plate, a stator fixed to said side plate, a rotor associated with said stator, switch contacts carried by said rotor and stator, an operating lever having a portion projecting through said slotted front plate, a hanger bracket plate positioned opposite said side plate, a supporting shaft extending between and held by said side plate and said bracket plate, and a bearing sleeve rotatably mounted on said shaft, said rotor and said lever being connected to said sleeve.

13. A selector switch of the character described comprising a mounting bracket including a slotted front plate and a rearwardly extending side plate, a stator fixed to said side plate, a rotor associated with said stator, switch contacts carried by said rotor and stator, an operating lever having a portion projecting through said slotted front plate, a hanger bracket plate positioned opposite said side plate, a supporting shaft extending between and held by said side plate and said bracket plate, and an indexing device comprising a spring detent carried by said shaft and positioned between said bracket plate and said lever and a lug carried by said lever and cooperable with said spring detent.

ROBERT L. WOLFF.